US008297796B2

(12) United States Patent
Catalano

(10) Patent No.: US 8,297,796 B2
(45) Date of Patent: Oct. 30, 2012

(54) ADJUSTABLE BEAM PORTABLE LIGHT

(75) Inventor: Anthony Catalano, Boulder, CO (US)

(73) Assignee: TerraLUX, Inc., Longmont, CO (US)

( * ) Notice: Subject to any disclaimer, the term of this patent is extended or adjusted under 35 U.S.C. 154(b) by 326 days.

(21) Appl. No.: 12/533,464

(22) Filed: Jul. 31, 2009

(65) Prior Publication Data
US 2010/0027085 A1 Feb. 4, 2010

Related U.S. Application Data

(60) Provisional application No. 61/085,700, filed on Aug. 1, 2008.

(51) Int. Cl.
B60Q 1/14 (2006.01)
(52) U.S. Cl. ............................. 362/280; 362/355; 359/15
(58) Field of Classification Search .................. 362/277, 362/280, 355; 359/15, 27
See application file for complete search history.

(56) References Cited

U.S. PATENT DOCUMENTS

| 3,795,830 | A |   | 3/1974  | Richardson   |
|-----------|---|---|---------|--------------|
| 4,211,955 | A |   | 7/1980  | Ray          |
| 4,214,295 | A | * | 7/1980  | Morton ............ 362/164 |
| 4,727,289 | A |   | 2/1988  | Uchida       |
| 4,999,750 | A |   | 3/1991  | Gammache     |
| 5,097,180 | A |   | 3/1992  | Ignon et al. |
| 5,189,339 | A |   | 2/1993  | Peshak       |
| 5,222,800 | A |   | 6/1993  | Chan et al.  |
| 5,463,280 | A |   | 10/1995 | Johnson      |
| 5,465,197 | A |   | 11/1995 | Chien        |
| 5,561,346 | A |   | 10/1996 | Byrne        |
| 5,575,459 | A |   | 11/1996 | Anderson     |
| 5,632,551 | A |   | 5/1997  | Roney et al. |
| 5,655,830 | A |   | 8/1997  | Ruskouski    |
| 5,663,719 | A |   | 9/1997  | Deese et al. |
| 5,850,126 | A |   | 12/1998 | Kanbar       |
| 5,936,599 | A |   | 8/1999  | Reymond      |
| 5,994,845 | A |   | 11/1999 | Gibboney, Jr.|
| 6,019,493 | A |   | 2/2000  | Kuo et al.   |
| 6,091,614 | A |   | 7/2000  | Malenfant    |
| 6,111,739 | A |   | 8/2000  | Wu et al.    |
| 6,140,776 | A |   | 10/2000 | Rachwal      |
| 6,150,771 | A |   | 11/2000 | Perry        |
| 6,161,910 | A |   | 12/2000 | Reisenauer et al. |
| 6,184,628 | B1 |  | 2/2001  | Begemann     |
| 6,190,020 | B1 |  | 2/2001  | Hartley      |
| 6,218,785 | B1 |  | 4/2001  | Incerti      |
| 6,220,722 | B1 |  | 4/2001  | Begemann     |
| 6,232,784 | B1 |  | 5/2001  | Dulasky      |
| 6,234,648 | B1 |  | 5/2001  | Borner et al.|
| 6,242,870 | B1 |  | 6/2001  | Koyanagi et al. |
| 6,310,445 | B1 |  | 10/2001 | Kashaninejad |
| 6,313,589 | B1 |  | 11/2001 | Kobayashi et al. |
| 6,371,636 | B1 |  | 4/2002  | Wesson       |

(Continued)

FOREIGN PATENT DOCUMENTS
JP 2004146205 5/2004

Primary Examiner — Jennifer L. Doak
(74) Attorney, Agent, or Firm — Bingham McCutchen LLP

(57) ABSTRACT

A lighting device is disclosed which provides for an adjustable beam. The adjustable beam involves the use of a hologram diffuser with areas that have different diffusing properties. The different diffusing areas are selectively positionable in a light beam created by the lighting device to provide for an adjustable beam by providing different diffusions of the light.

34 Claims, 7 Drawing Sheets

U.S. PATENT DOCUMENTS

| | | |
|---|---|---|
| 6,380,865 B1 | 4/2002 | Pederson |
| 6,485,160 B1 | 11/2002 | Sommers et al. |
| 6,528,954 B1 | 3/2003 | Lys et al. |
| 6,570,505 B1 | 5/2003 | Malenfant |
| 6,580,228 B1 | 6/2003 | Chen et al. |
| 6,595,671 B2 | 7/2003 | Lefebvre et al. |
| 6,634,771 B2 | 10/2003 | Cao |
| 6,644,841 B2 | 11/2003 | Martineau |
| 6,727,652 B2 | 4/2004 | Sivacumarran |
| 6,733,152 B2 | 5/2004 | Maglica |
| 6,791,283 B2 | 9/2004 | Bowman et al. |
| 6,793,374 B2 | 9/2004 | Begemann |
| 6,819,056 B2 | 11/2004 | Lin |
| 6,853,151 B2 | 2/2005 | Leong et al. |
| 6,871,983 B2 | 3/2005 | Jacob et al. |
| 6,880,951 B2 | 4/2005 | Yoon |
| 6,893,140 B2 | 5/2005 | Storey et al. |
| 6,924,605 B2 | 8/2005 | Chun |
| 6,948,829 B2 | 9/2005 | Verdes et al. |
| 6,957,897 B1 | 10/2005 | Nelson et al. |
| 6,981,784 B2 | 1/2006 | Dubuc |
| 7,008,084 B2 | 3/2006 | Galli |
| 7,015,650 B2 | 3/2006 | McGrath |
| 7,204,602 B2 | 4/2007 | Archer |
| RE39,856 E | 9/2007 | Ruthenberg |
| 7,296,913 B2 | 11/2007 | Catalano et al. |
| 7,300,173 B2 | 11/2007 | Catalano et al. |
| 7,318,661 B2 | 1/2008 | Catalano |
| 7,448,770 B2 | 11/2008 | Catalano et al. |
| 7,597,456 B2 | 10/2009 | Catalano et al. |
| 7,699,494 B2 | 4/2010 | Catalano et al. |
| 7,777,430 B2 | 8/2010 | Catalano et al. |
| 7,852,015 B1 | 12/2010 | Yen et al. |
| 7,946,730 B2 | 5/2011 | Catalano et al. |
| 2001/0014019 A1 | 8/2001 | Begemann |
| 2002/0030455 A1 | 3/2002 | Ghanem |
| 2002/0130786 A1 | 9/2002 | Weindorf |
| 2002/0141196 A1 | 10/2002 | Camarota et al. |
| 2003/0039122 A1 | 2/2003 | Cao |
| 2003/0067787 A1 | 4/2003 | Serizawa |
| 2003/0112627 A1 | 6/2003 | Deese |
| 2003/0179548 A1 | 9/2003 | Becker et al. |
| 2003/0210552 A1 | 11/2003 | Barlian et al. |
| 2004/0028099 A1 | 2/2004 | Hongo et al. |
| 2004/0070990 A1 | 4/2004 | Szypszak |
| 2004/0189262 A1 | 9/2004 | McGrath |
| 2005/0052865 A1 | 3/2005 | Siktberg et al. |
| 2005/0057187 A1 | 3/2005 | Catalano |
| 2005/0225985 A1 | 10/2005 | Catalano et al. |
| 2005/0231948 A1* | 10/2005 | Pohlert et al. ................. 362/237 |
| 2006/0012997 A1 | 1/2006 | Catalano et al. |
| 2006/0250270 A1 | 11/2006 | Tangen |
| 2007/0019415 A1* | 1/2007 | Leblanc et al. ................ 362/299 |
| 2008/0019123 A1 | 1/2008 | Catalano et al. |
| 2008/0024070 A1 | 1/2008 | Catalano et al. |
| 2008/0099770 A1 | 5/2008 | Mendendorp et al. |
| 2008/0130288 A1 | 6/2008 | Catalano et al. |
| 2009/0034262 A1 | 2/2009 | Catalano et al. |
| 2009/0309501 A1 | 12/2009 | Catalano et al. |
| 2010/0117560 A1 | 5/2010 | Cao |
| 2010/0165611 A1 | 7/2010 | Catalano et al. |
| 2010/0320499 A1 | 12/2010 | Catalano et al. |
| 2011/0019417 A1 | 1/2011 | Van Laanen et al. |
| 2011/0260647 A1 | 10/2011 | Catalano |

* cited by examiner

ADJUSTABLE BEAM PORTABLE LIGHT

RELATED APPLICATIONS

The present application claims priority from U.S. Provisional Application Ser. No. 61/085,700, filed on Aug. 1, 2008, which is incorporated herein by reference.

BACKGROUND

Various types of lighting devices are produced to meet the demands of various lighting tasks. These lighting devices can be broadly defined by two categories: fixed and portable. While all lighting devices can be made portable, portable lighting in this context refers to those that are made to be repositioned by hand by a user to illuminate various tasks, while fixed lighting devices, on the other hand, are made to be installed in a single location where the fixture remains. Many portable lights include a mounting device, such as a magnet or a clip, for temporarily holding the light in a position. Examples of portable lighting devices include flashlights and work lights such as those used by auto mechanics to illuminate specific parts of an auto while work is being performed. Examples of fixed lighting devices include down lights in the ceiling of a home or street lights which are mounted on a light pole to illuminate a street at night.

Portable lights can be powered using either AC or DC power sources to cause the lamp of the lighting device to produce light. Typically a portable light with an AC power source relies on an electrical cord with a power plug for connecting the light to a wall socket to receive AC power. Lights with DC power sources typically have one or more batteries to provide the power to generate light. Depending on the type of lamp used in the lighting device, other electronics, such as a driver circuit, may also be required to convert the AC or DC power to a form that is usable by the particular type of lamp used.

Light emitting diodes (LEDs) are one type of lamp that are used in portable lights which require the use of a driver circuit to convert AC power to a relatively low voltage DC power. Typical wall sockets in the United States are 120V AC while typical LEDs require less than 10V DC. However, even though LED lamps often require the use of a driver circuit, these lamps are becoming increasingly popular as a light source because of their high efficiency and long life.

LEDs are semiconductor devices which have a semiconductor die that produces the light in response to receiving power in the correct range of voltage and current. LEDs are often provided with a lens attached or close to the semiconductor die to direct light from the die so that the light can be more fully utilized. Secondary optics in the lighting device can also be used to reform the beam of light from the LED to attempt to meet the needs of the intended user.

Conventional portable lighting devices are equipped with either fixed focus optics or with adjustable focus optics. Light distribution in fixed focus lighting devices is usually determined by the source of light in combination with one or more optical elements such as a reflector or lens. In these devices, the light distribution is not adjustable. This means that light is spread over or focused on a fixed area relative to the lighting device and the user must move the lighting device in order to change the area that is illuminated. This can be a problem in situations where the lighting device is temporarily attached to hold the device fixed at an available position but the light from the device is not illuminating the desired task correctly. Conventional flashlights have a non movable reflector that is positioned under a protective transparent material. In these flashlights, the focus of the light is fixed relative to the light source. In these and in similar fixed focus devices, the optics are not replaceable because of space, cost and other considerations.

Another fixed type optic involves the use of diffusion screens to spread the illumination. Conventional diffusion screens have textured surfaces which generally provide poor control and waste light because they randomly disperse light. Moreover, these diffusion screens do not provide for adjustability in the light dispersion.

Conventional adjustable focus optics can cause non-uniformities when the distance between the optic and the light source is changed. One example of this involves flashlights that use a parabolic reflector that is moved toward and away from the light source to adjust the light distribution. In this instance, moving the reflector towards or away from the light source results in an out of focus condition where a dark central region, sometimes referred to as a "donut hole", is created. Of course having a dark central region in the light distribution is counter productive since it diminishes the ability to see what is in the center of the illuminated task.

The present invention provides a highly advantageous lighting device and method that are submitted to resolve the foregoing problems and concerns while providing still further advantages, as described hereinafter.

SUMMARY OF THE INVENTION

The present invention overcomes the limitations of fixed focus and conventional adjustable focus lighting devices by providing an efficient adjustable light dispersion without causing non-uniformities in the illumination.

In one embodiment, according to the present disclosure, a method for dispersing light from at least one light emitting diode (LED) light source having a light emitting semiconductor die that produces light in response to receiving electrical energy is described. The method includes configuring a thin film holographic diffuser to include at least two different light diffusing holograms, each of which has a different dispersion property. The diffuser is supported in a positional relationship for movement of the diffuser relative to the LED to operate in at least two different diffusing modes for dispersing light from the LED. Each diffusing mode corresponds to diffusing the light from the LED selectively through one of the light diffusing holograms.

Another embodiment involves a lighting device that disperses light from at least one light emitting diode (LED) light source having a light emitting semiconductor die that produces light in response to receiving electrical energy. A thin film holographic diffuser includes at least two different light diffusing holograms, each of which has a different dispersion property. A support supports the diffuser in a positional relationship for movement of the diffuser relative to the LED to operate in at least two different diffusing modes for dispersing light from the LED. Each diffusing mode corresponds to diffusing the light from the LED selectively through one of the light diffusing holograms.

DETAILED DESCRIPTION OF THE INVENTION

Figure 1:
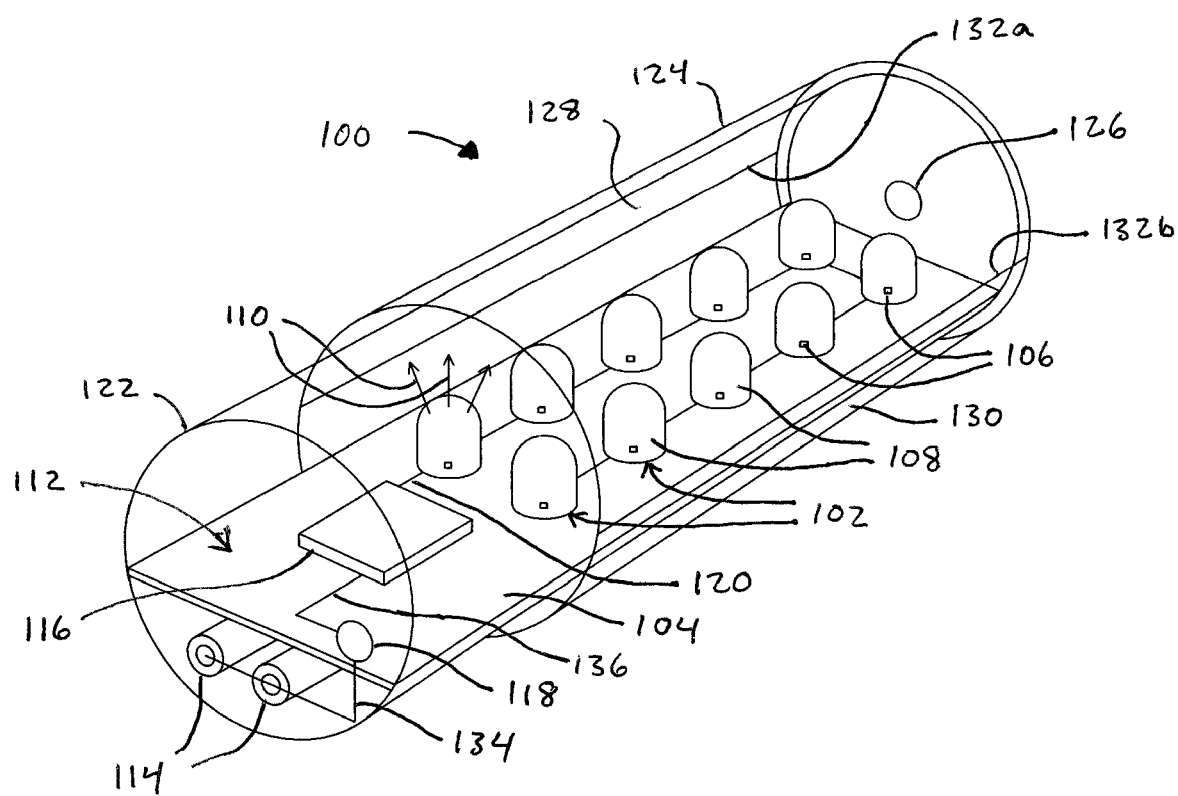
FIG. 1 is a diagrammatic perspective view of a lighting device incorporating a thin film holographic diffuser having two distinct light diffusing holograms.

While this invention is susceptible to embodiment in many different forms, there are shown in the drawings, and will be described herein in detail, specific embodiments thereof with the understanding that the present disclosure is to be considered as an exemplification of the principles of the invention and is not to be limited to the specific embodiments described. Descriptive terminology such as, for example, uppermost/lowermost, right/left, front/rear and the like has been adopted for purposes of enhancing the reader's understanding, with respect to the various views provided in the figures, and is in no way intended as been limiting.

Referring to the drawings, wherein like components may be indicated by like reference numbers throughout the various figures, FIG. 1 illustrates one embodiment of a portable lighting device, generally indicated by the reference number 100. Lighting device 100 includes an array of light emitting diodes 102 (LEDs) arranged on a board 104. In the present case, LEDs 102 each include a semiconductor die 106 and a lens 108 made from a plastic material. Light, as represented by arrows 110, is produced by die 106 in response to receiving electrical power. Lens 108 is arranged to direct light 110 from die 106 into a generally outward direction.

Power can be provided to LEDs 102, in the present example, by a DC power source 112 having a pair of batteries 114 and a driver circuit 116. Batteries 114 are connected to driver circuit 116 through an on/off switch 118 which is used to selectively turn the LEDs on and off as desired by the user. During operation, power from batteries 114 passes through switch 118 to driver circuit 116 using conductors 134 and 136. Driver circuit 116 converts the power to a voltage and current that is suitable for LEDs 102. Converted power from driver circuit 116 is provided to LEDs 112 through conductors 120. It should be appreciated that any suitable power supply arrangement may be used for all embodiments described herein.

A device housing 122 supports and houses various components of lighting device 100, including board 104, power source 112 and LEDs 102. Housing 122 can be made of a plastic material generally in the shape of a cylinder (in the present case) and at least a portion of the housing is sufficiently transparent to allow light 110 from the LEDs to exit the housing without substantially reducing the intensity of the light.

Lighting device 100 includes a unique hologram diffuser 124 that can be generally cylindrically shaped having a sidewall that is relatively thin, for example, and may be attached to device housing 122 at a rotatable pivot connection 126. Pivot connection 126 allows diffuser 124 to be rotated with respect to housing 122 around a common central axis (not shown). In the present example, diffuser 124 has two distinct optical areas 128 and 130 which are delineated in FIG. 1 by border lines 132a and 132b. Optical areas 128 and 130 are each configured with holographic diffusers that have different diffusing angles each of which may be referred to as an angle of dispersion.

Figure 2:
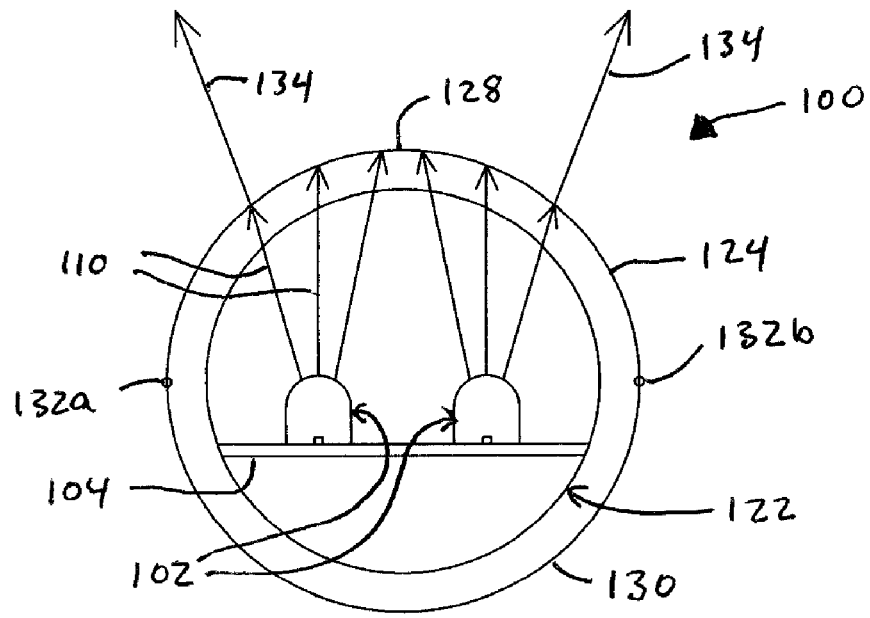
FIG. 2 is a diagrammatic view of the lighting device shown in FIG. 1 with light passing through a first one of the light diffusing holograms.

Turning to FIG. 2, in conjunction with FIG. 1, the former is an end view of device 100. As positioned in FIG. 1, hologram optical area 128 is generally above LEDs 102 and hologram optical area 130 is generally below LEDs 102. In this orientation or mode of operation, see FIG. 2, light 110 will pass through and be diffused by hologram optical area 128, as shown by diffused light represented by arrows 134.

Figure 3:
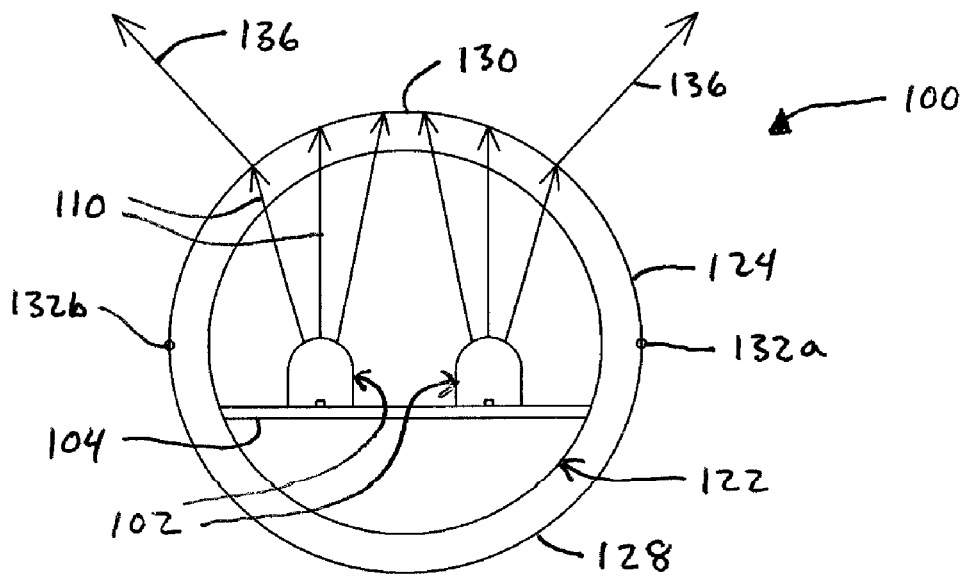
FIG. 3 is a diagrammatic view of the lighting device shown in FIG. 1 with light passing through a second one of the light diffusing holograms.

Turning to FIG. 3 in conjunction with FIG. 1, the former is an end view of device 100 with diffuser 124 rotated to a different position. In particular, by rotating hologram diffuser 124 relative to device housing 122, a second mode of operation is enabled. In this mode, hologram optical area 130 is positioned so that the light is diffused by optical area 130, see FIG. 3 where diffused light is represented by arrows 136. Since hologram optical areas 128 and 130 have different diffusing angles, the user can thereby use the different diffusing areas to adjust the light distribution from lighting device 100. Neither of the hologram optical areas cause the light to be out of focus or to have other non-uniformities, therefore lighting device 100 can provide an adjustable beam without non-uniformity in the illumination.

Figure 4:
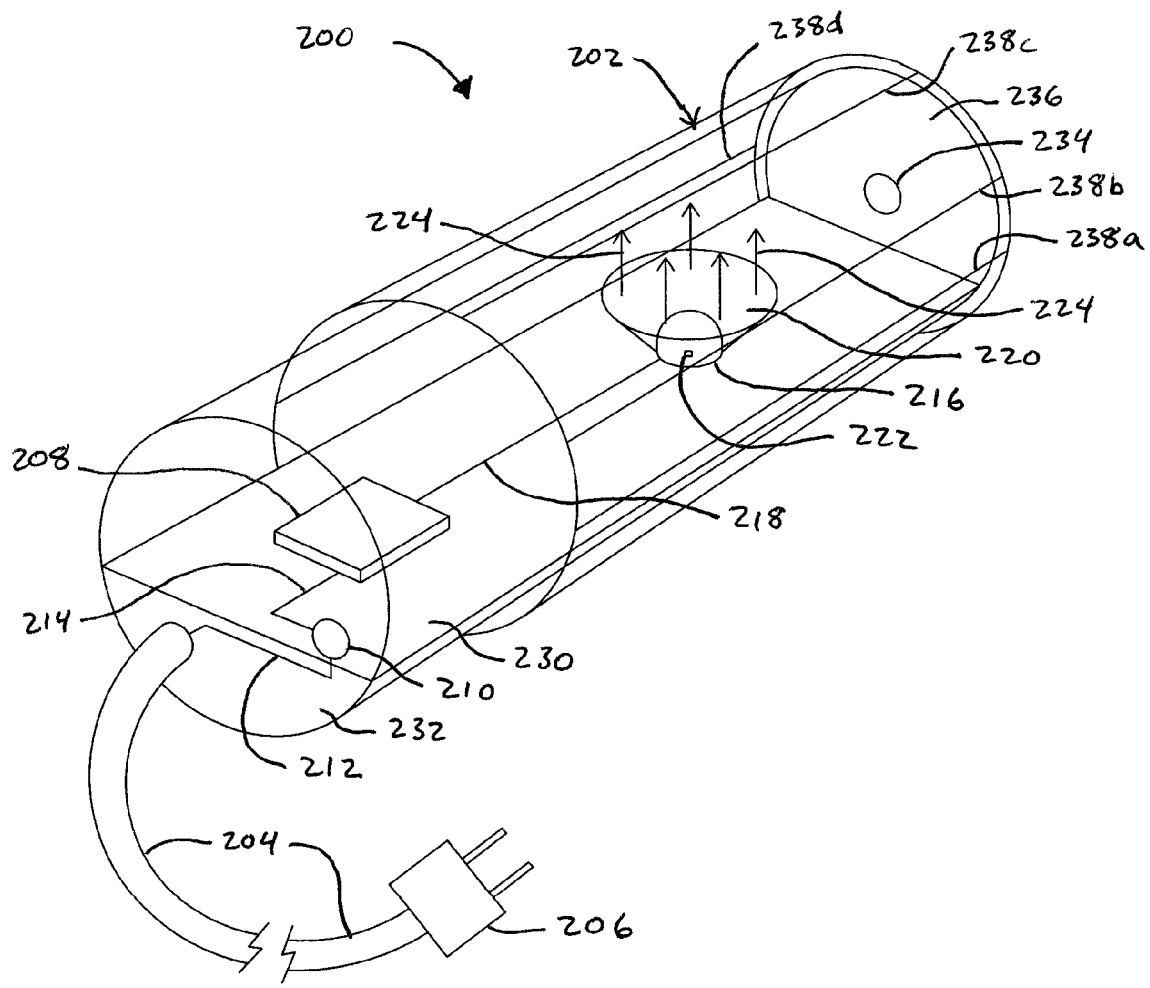
FIG. 4 is a diagrammatic perspective view of a lighting device incorporating a thin film holographic diffuser having a continuously variable hologram diffuser.

In another embodiment, one of the optical areas 128 or 130 could be a holographic diffuser while the other of the optical areas could have no substantial effect on the light from the LED. This arrangement provides for selection between diffused light and non-diffused light. FIG. 4 illustrates another lighting device having a hologram diffuser. Lighting device 200 includes a hologram diffuser 202 that has a continuous variable light distribution between two limits. Lighting device 200 is an example of a portable light which utilizes AC power to generate light. Lighting device 200 includes a cord 204 with a plug 206 for connecting to a household receptacle, (not shown), to receive AC power. AC power is fed from the receptacle to an AC powered driver circuit 208, represented by a block, through a power switch 210 using conductors 212 and 214. Driver circuit 208 converts the AC power to a DC voltage and current that are within the range usable by at least one LED 216 and transmits the DC power to LED 216 through conductors 218.

LED 212 and driver circuit 208 are connected to a board 230 which is positioned in a housing 232. Housing 232 as well as housing 122 (FIG. 1) can be sealed against moisture, dust and air, and housing 122 can be hermetically sealed against intrusion from microorganisms, and/or can be arranged to allow for replacement of batteries 114.

In the present embodiment, lighting device 200 includes only a single LED. LED 212 is representative of a high powered super bright LED that produces white light. In this embodiment, LED 212 includes focusing optics 220 which cause light from semiconductor die 222 to be focused generally in the same direction, as represented by arrows 224. The focusing optics can be part of the LED or can be a separate optical device.

Hologram diffuser 202 can be generally cylindrically shaped and fit over one end of housing 232. At least a portion of housing 232 is sufficiently transparent in a location which allows light 224 to exit the housing and pass through diffuser 202. Diffuser 202 can be pivotably mounted to housing 232 at a pivot connection 234 which allows diffuser 202 to rotate relative to housing 232 about a common central axis.

Hologram diffuser 202 includes a hologram optical area 236 in which the diffusing angle varies from one circumferential position to another. To assist in illustrating this concept, optical area 236 is divided up using lines 238a to 238d. In the present example, the diffusing angle increases: from 0.5 degree at 238a to 10.0 degrees at 238b; from 10.0 degrees at 238b to 30.0 degrees at 238c; and from 30.0 degrees at 238c to 50.0 degrees at 238d. By rotating diffuser 202 relative to housing 232, different portions of diffusing optical area 236 are lined up to diffuse light 224, thereby giving the user the ability to adjust the amount of diffusion angle as desired within the diffusion angles provided in hologram diffuser 202. Of course, these angles can be different than the ones used in this illustration and the diffusing area can extend all the way around hologram diffuser 202.

Figure 5:
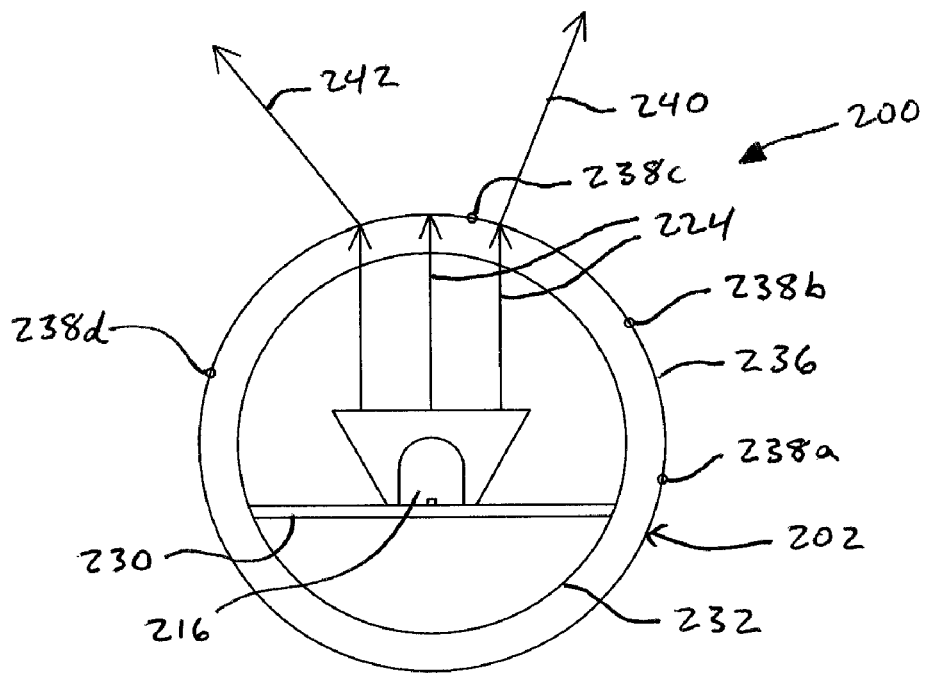
FIG. 5 is a diagrammatic view of the lighting device shown in FIG. 4 with light passing through a first portion of the continuously variable hologram diffuser.

Attention is now directed to FIG. 5 in conjunction with FIG. 4 wherein the former is a diagrammatic end view of device 200, FIG. 5 shows, in particular, the positions of lines 238a-d. As diffuser 202 is positioned for a first mode of operation in FIG. 4, some of light 224 is diffused at an angle greater than 30.0 degrees and some is diffused at an angle less than 30.0 degrees, see the end view in FIG. 5 where, in the first mode, diffused light at less than 30.0 degrees is represented by arrow 240 and diffused light at greater than 30.0 degrees is represented by arrow 242.

Figure 6:
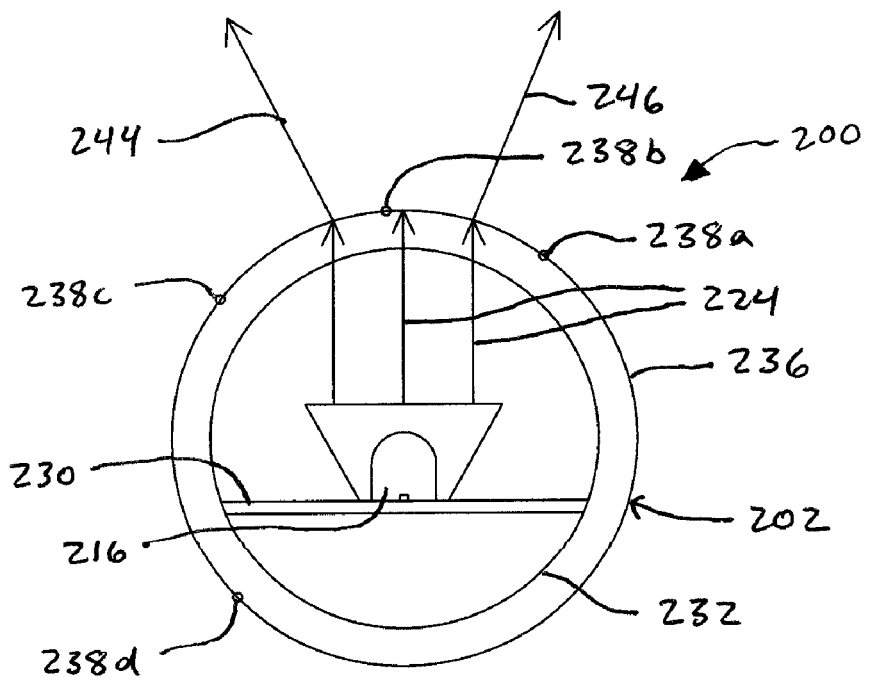
FIG. 6 is a diagrammatic view of the lighting device shown in FIG. 4 with light passing through a second portion of the continuously variable hologram diffuser.

Turning to FIG. 6 in conjunction with FIG. 4, the former is an end view of device 200 with diffuser 202 rotated to a different position. When diffuser 202 is rotated with respect to housing 232, as shown in FIG. 6, a second mode of operation is where some of light 224 is diffused at an angle greater than 10.0 degrees as represented by arrow 244 and some of the light is diffused at an angle that is less than 10.0 degrees as represented by arrow 246.

As can be understood from the previous examples, other modes of operation can also be realized by turning diffuser 202 relative housing 232 to positions other than those shown in FIGS. 5 and 6.

Figure 7:
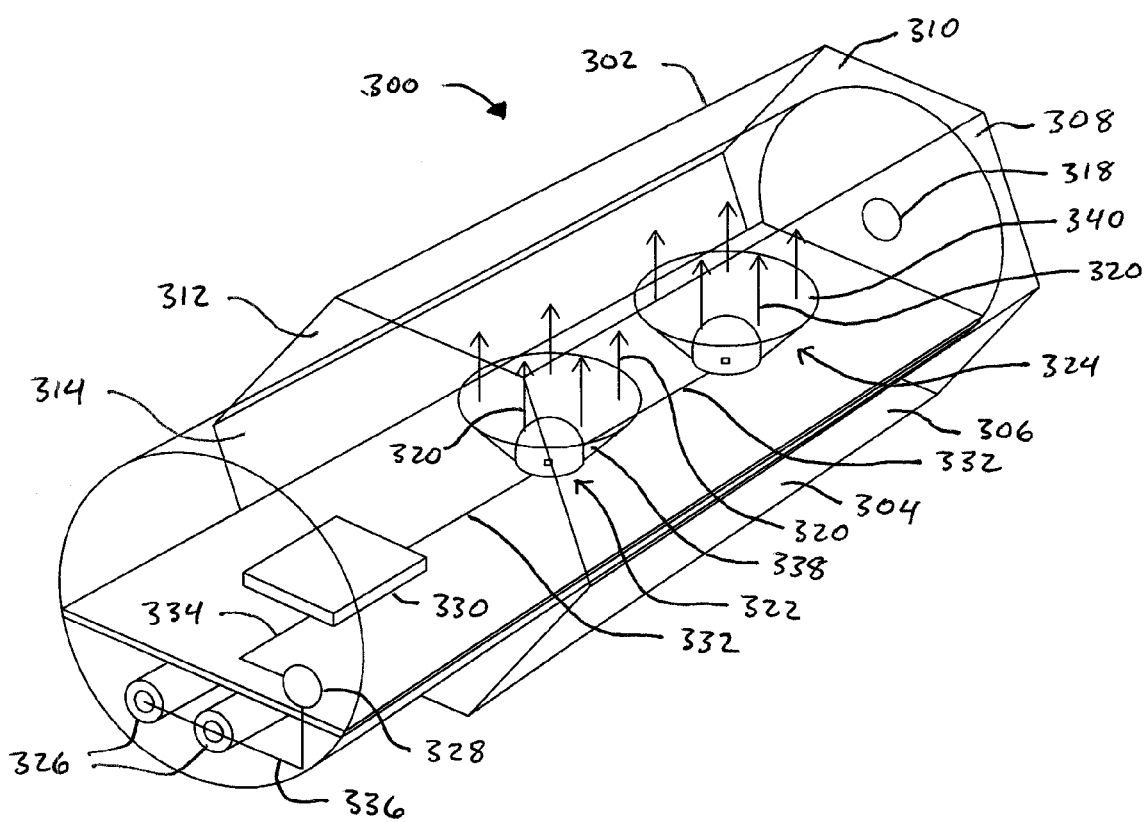
FIG. 7 is a diagrammatic perspective view of a lighting device incorporating a hexagonal holographic diffuser with different hologram diffusers on more than one surface.

FIG. 7 is illustrative of another embodiment of a lighting device having a hologram diffuser. In this instance, a lighting device is generally indicated by the reference number 300 and includes a hologram diffuser 302 that has a hexagonal shape in an end view defined by six adjoining sidewalls of a suitable thickness. The hexagonal shape allows the use of flat surfaces for the optical areas. Diffuser 302 can have six flat diffusing areas 304, 306, 308, 310, 312 and 314, each of which can have a different light diffusing property and each of which can provide a different mode of operation when aligned with light from the LEDs yet to be described. Diffuser 302 is attached to a housing 316 using a pivotable connection 318 which allows the diffuser to rotate around the housing to selectively position each of the six diffusing areas where light 320 from LEDs 322 and 324 passes through and is diffused by hologram diffuser 302.

Lighting device 300 includes a DC power source which utilizes batteries 326, switch 328, driver circuit 330 as well as conductors 332, 334 and 336 to power LEDs 322 and 324. The two LEDs 322 and 324 each include a focusing lens 338 and 340, respectively.

Figure 8:
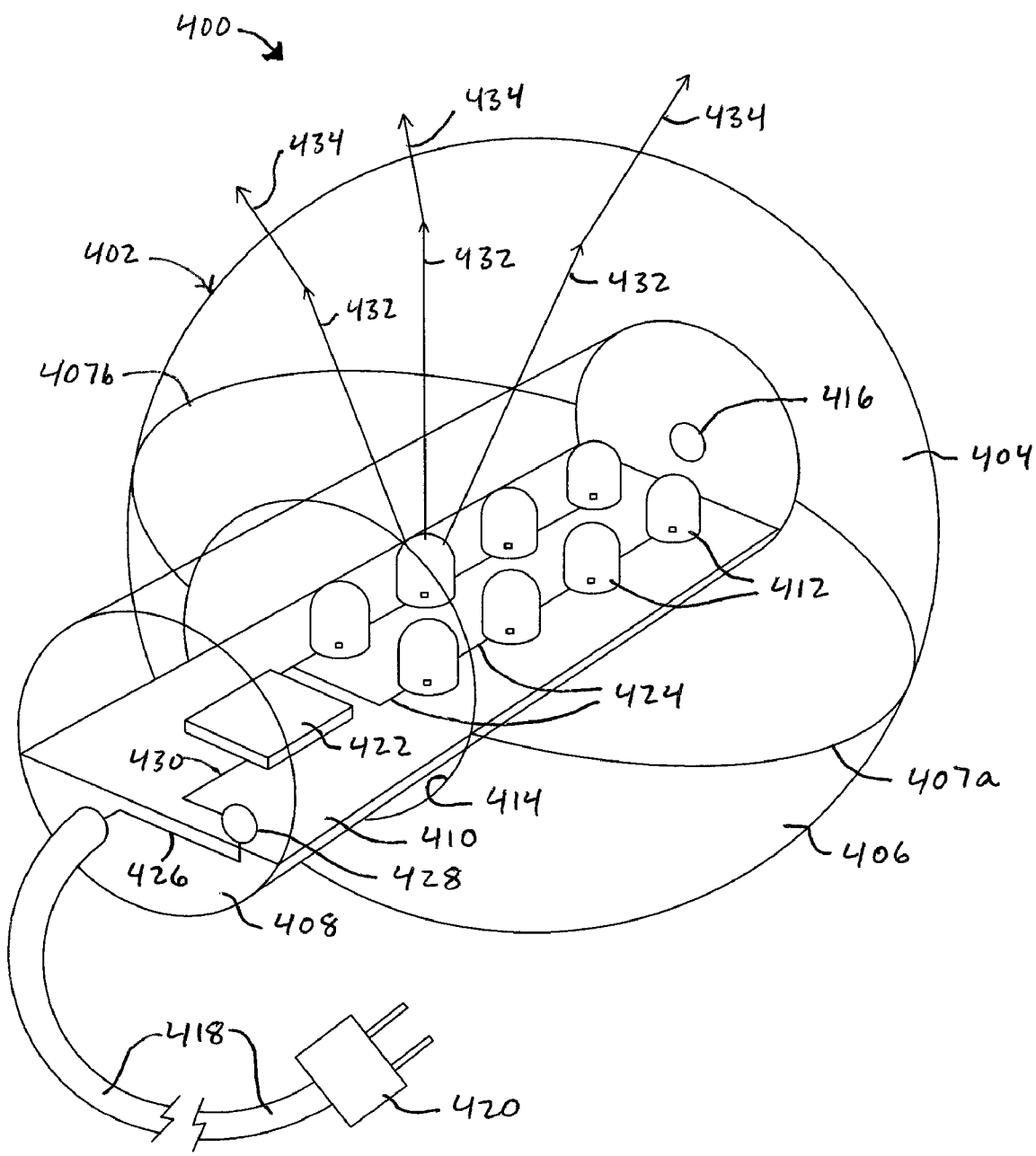
FIG. 8 is a diagrammatic perspective view of a lighting device incorporating a spherical hologram diffuser with different hologram diffusers on different portions of the spherical surface.

Another embodiment of a portable lighting device having a hologram diffuser is shown in FIG. 8. In this embodiment, lighting device 400 includes a hologram diffuser 402 that is spherical in shape. Hologram diffuser 402 includes hologram optical diffuser areas 404 and 406 that each have different diffusing properties from one another and are defined in the illustration by boundary lines 407a and 407b.

Lighting device 400 includes a housing 408 which encloses a board 410 that can support a series of LEDs 412. It should be appreciated that any suitable number of one or more LEDs cab be used. Housing 408 can be at least generally cylindrically shaped and extend through an opening 414 defined by the diffuser. Housing 408 can be attached to hologram diffuser 402 using a pivotable connection 416 which allows the diffuser to rotate with respect to the housing to operate in different modes that can correspond to the various diffusing regions of diffuser 402.

Lighting device 400 can include a cord 418 and plug 420 for receiving AC power from a receptacle, (not shown). A driver circuit 422 converts the AC power to DC for use by LEDs 412. Converted DC power is supplied to the LEDs through conductors 424 and AC power is received by the driver circuit through plug 420, cord 48, switch 428 and conductors 426 and 430. In another embodiment, battery power may be used.

Housing 408 includes a transparent region that is positioned in the diffuser and sufficiently transparent to allow light from LEDs 412 to escape the housing. Light from LEDs 412, represented by arrows 432, exits housing 408 and travels to hologram diffuser 402 which diffuses the light as the light passes through diffuser optical area 404 in a first mode of operation, as illustrated in FIG. 8. Diffuser area 404 produces a diffused light, represented by arrows 434, from the light generated by the LEDs. Hologram diffuser 402 can be rotated around pivotable connection 416 relative to the housing to align diffuser optical area 406 above the LEDs for operation in a second mode. Hologram diffuser optical areas 404 and 406 each have a different diffusing property in the present embodiment.

In addition, the diffuser areas in lighting device 400 as well as in the other examples described above can have diffusing properties that vary in all directions along the surface of the hologram diffuser. Using different diffusing areas with different diffusing properties, a lighting device can provide adjustment between different beam spreads such as between a spot light, either a linear narrow beam or a true spot, and a floodlight without changing the overall volume, size and shape of the lighting device.

Figure 9:
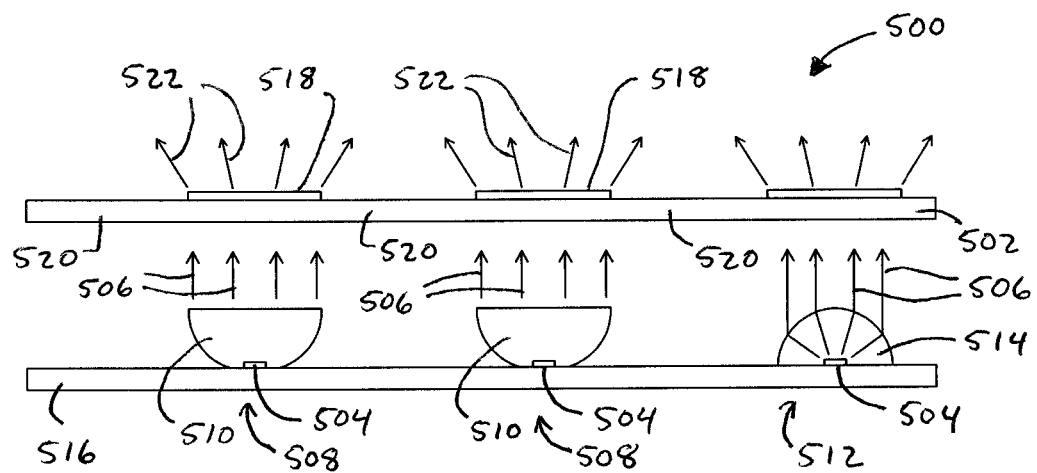
FIG. 9 is a diagrammatic elevation view of a lighting device incorporating a moveable hologram diffuser in one position.
Figure 10:
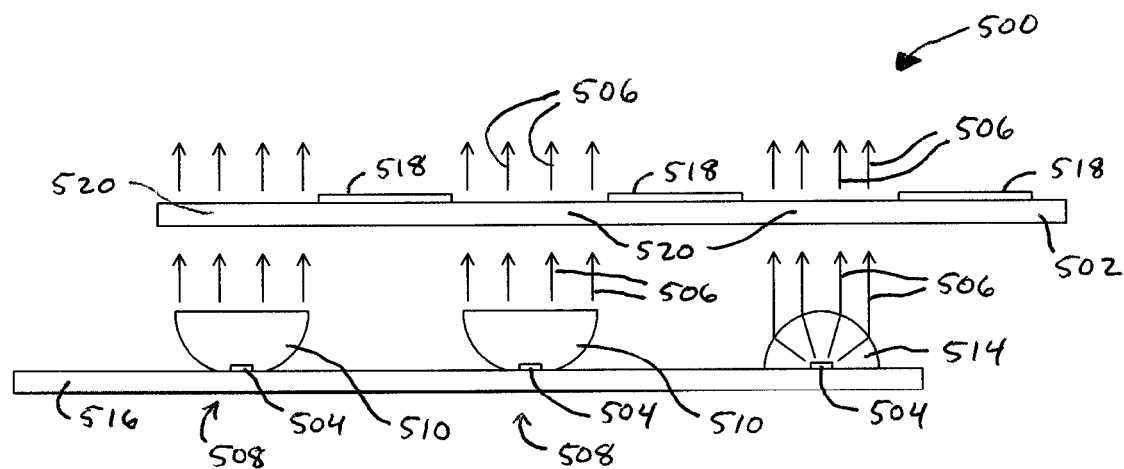
FIG. 10 is a diagrammatic elevation view of the lighting device shown in FIG. 9 with the moveable hologram diffuser in another position.

FIGS. 9 and 10 are illustrative of another embodiment of a lighting device having a hologram diffuser. In this instance, a lighting device is generally indicated by the reference number 500 and includes a hologram diffuser 502. In this instance, lighting device 500 includes multiple LEDs having focusing optics for collimating light produced by die 504, as represented by arrows 506. LEDs 508 each include a reflector 510 to collimate the light and LED 512 includes a lens 514 for collimating the light. Lighting device 500 is shown with LEDs having two different types of focusing optics to illustrate some of the different types of optics that can be used for collimating light. Other types of focusing optics can also be used, including bubble optics. Each of the LEDs is mounted to a board 516 and the LEDs are powered by a power supply (not shown) using power that is converted to a form usable by the LEDs as can be understood based on previous embodiments above.

FIGS. 9 and 10 show hologram diffuser 502 positioned above LEDs 508 and 512. Holographic diffuser 502 includes first optical areas 518 and second optical areas 520. In the present embodiment, optical areas 518 are holographic diffusers for receiving light 506 from the LEDs, that is collimated at least to a useful extent, and diffusing the light and optical areas 520 are transparent for passing light 506 substantially unaltered.

Holographic diffuser 502 is movable relative to LEDs 508 and 512. FIG. 9 shows lighting device 500 is a first mode of operation where holographic diffuser 502 is positioned so that light 506 is directed at first optical areas 518 which produce diffused light, represented by arrows 522. FIG. 10 shows lighting device 500 in a second mode of operation where hologram diffuser 502 is moved to a position so that light 506 is directed at second optical areas 518 which pass the light substantially unaffected. In the embodiment shown in FIGS. 9 and 10, the holographic diffuser is shown moving between positions where light 506 either passes through the optical area with the holographic diffuser or passes through a substantially transparent optical area.

FIGS. 9 and 10 illustrate an embodiment where there are multiple LED light sources that each has focusing optics for collimating light from their respective die. Holographic diffuser 502 is configured with one of each of the different types of optical areas for each LED light source. Although FIGS. 9 and 10 show only two different types of optical areas, the holographic diffuser can have multiple different types of optical areas for each of the LEDs. In addition, while lighting device 500 is shown with three LEDs, the lighting device can have one or more LEDs which can be arranged in an array or in another arrangement. The holographic diffuser can also be supported for movement in any direction relative to the LEDs, this allows the optical areas to have different arrangements.

The housing and the hologram diffuser can each have shapes other than those described in the examples above so long as the diffuser is movable relative to the housing so that different areas of the diffuser can be moved into a location where light from the housing shines through the diffuser. Other light sources can also be used in place of and/or in conjunction with the LED light sources.

The hologram diffuser can be supported by a carrier mechanism for positioning the diffuser directly over the focused beam of the light source. The carrier mechanism can rotate and/or translate the diffuser in a horizontal or vertical direction to orient the diffuser over the light source or sources. The carrier mechanism can use a micro motor (stepper motor), piezo-electric mechanical actuator or other motion control actuator with sufficient positional accuracy to selectively position the various optical areas in the path of the light from the lights.

The hologram diffusers in the examples can be produced using a thin film material. Other materials may also be used for the hologram diffusers such as thick or thin plastic, glass or other materials that are suitable for use in the production of a hologram. The hologram can be an embossed pattern on the surface of material. The embossing onto the surface can be done by a molding, lithographic or other suitable process. Holographic diffusers offer a higher transmission of light than typical ground or opal glass diffuser. Holographic diffusers also offer a more even distribution of light and allow control over the amount of diffusion by selection of the diffusing angle and aspect ratio. Diffusing angles are for collimated light and angular divergence varies for different incidence angles. Holographic diffusers can have a transmission efficiency of greater than 90% from filament lamps, LEDs, arc lamps and other light sources. Holographic diffusers are available commercially from several firms, including Edmund Optics in New Jersey.

The hologram diffuser can also be made in different sizes. For example the diffuser can be made very small, such as the size of the semiconductor die used in a LED. A typical semiconductor die is approximately 1.0×1.0 mm square. The hologram diffuser can be an array of small diffusers for an array of LEDs, where each semiconductor die of the LEDs has a positionable holographic diffuser. This allows the lighting device to change the light pattern on a near-microscopic level.

Because the hologram diffuser is external to the source of light, electronics and power source, the light may be hermetically sealed if necessary to prevent exposure to explosive atmosphere. Other items such as heat sinks or other devices for dissipating heat can be provided in the lighting device.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method for forming an apparatus that disperses light from a light source comprising at least one light emitting diode (LED), each LED having a light emitting semiconductor die that produces light in response to receiving electrical energy, the method comprising:
   providing a holographic diffuser having at least two different solid optical areas each having a different dispersion property, at least one of the optical areas being a light diffusing hologram; and
   disposing the diffuser in a positional relationship for movement of the diffuser relative to the light source to operate in at least two different modes for directing light from the light source, each mode corresponding to directing light from the light source selectively through only one of the optical areas.

2. A method as defined in claim 1 wherein the at least two optical areas comprise (i) a first optical area comprising a light diffusing hologram for producing a spot light pattern from light from the at least one LED and (ii) a second optical area comprising a light diffusing hologram for producing a flood light pattern from light from the at least one LED.

3. A method as defined in claim 1 wherein the at least two optical areas comprise (i) a first optical area comprising a light diffusing hologram having a first angle of dispersion and (ii) a second optical area comprising a light diffusing hologram having a second angle of dispersion that is different from the first angle of dispersion.

4. A method as defined in claim 1 wherein the at least two optical areas comprise different portions of a continuously variable diffuser.

5. A method as defined in claim 1 wherein at least a portion of a surface of the holographic diffuser is curved.

6. A method as defined in claim 1 wherein at least a portion of a surface of the holographic diffuser is planar.

7. A method as defined in claim 1 wherein at least a portion of a surface of the holographic diffuser is spherical.

8. A method as defined in claim 1 wherein the holographic diffuser has a cylindrical shape.

9. A method as defined in claim 8 wherein the holographic diffuser at least partially surrounds the light source.

10. A method as defined in claim 1 wherein the holographic diffuser has a hexagonal cross section and comprises six different planar surfaces, at least two of which comprise the at least two optical areas.

11. A method as defined in claim 1 wherein the at least one LED includes focusing optics for focusing light therefrom, and the holographic diffuser is configured to disperse the focused light.

12. A method as defined in claim 1 further comprising:
hermetically sealing the light source and a power supply in a housing, wherein disposing the diffuser includes attaching the diffuser to the housing.

13. A method as defined in claim 1 wherein the at least two optical areas comprise (i) a first optical area that is the light diffusing hologram and (ii) a second optical area having essentially no effect on light from the at least one LED.

14. A method as defined in claim 1 wherein the light source comprises (i) only one LED and (ii) focusing optics for collimating light from the light emitting semiconductor die of the LED, and wherein the holographic diffuser comprises only one of each of the at least two optical areas.

15. A method as defined in claim 1 wherein the light source comprises (i) a plurality of LEDs and (ii) focusing optics for collimating light from their respective dies, and wherein the holographic diffuser comprises one of each of the at least two optical areas for each LED.

16. A lighting device that disperses light from a light source comprising at least one light emitting diode (LED), each LED having a light emitting semiconductor die that produces light in response to receiving electrical energy, the lighting device comprising:
a holographic diffuser comprising at least two different solid optical areas each having a different dispersion property, at least one of the optical areas being a light diffusing hologram,
wherein the diffuser is disposed in a positional relationship for movement of the diffuser relative to the light source to operate in at least two different diffusing modes for dispersing light from the light source, each diffusing mode corresponding to directing light from the light source selectively through only one of the optical areas.

17. A lighting device as defined in claim 16 wherein the at least two optical areas comprise (i) a first optical area comprising a light diffusing hologram for producing a spot light pattern from light from the at least one LED, and (ii) a second optical area comprising a light diffusing hologram for producing a flood light pattern from light from the at least one LED.

18. A lighting device as defined in claim 16 wherein the at least two optical areas comprise (i) a first optical area comprising a light diffusing hologram having a first angle of dispersion and (ii) a second optical area comprising a light diffusing hologram having a second angle of dispersion that is different from the first angle of dispersion.

19. A lighting device as defined in claim 16 wherein the at least two optical areas comprise different portions in a continuously variable hologram diffuser.

20. A lighting device as defined in claim 16 wherein at least a portion of a surface area of the holographic diffuser has a curved configuration.

21. A lighting device as defined in claim 16 wherein at least a portion of a surface area of the holographic diffuser is planar.

22. A lighting device as defined in claim 16 wherein at least a portion of a surface area of the holographic diffuser is spherical.

23. A lighting device as defined in claim 16 wherein at least a portion of the holographic diffuser is cylindrical.

24. A lighting device as defined in claim 23 wherein the holographic diffuser at least partially surrounds the light source.

25. A lighting device as defined in claim 16 wherein the holographic diffuser has a hexagonal cross section and comprises six different planar surfaces, at least two of which comprise the at least two optical areas.

26. A lighting device as defined in claim 16 wherein at least a portion of the holographic diffuser is spherical.

27. A lighting device as defined in claim 16 wherein the at least one LED includes focusing optics for focusing light therefrom, and the holographic diffuser is configured to disperse the focused light.

28. A lighting device as defined in claim 16 further comprising:
a power supply; and
a housing attached to the diffuser, the housing (i) hermetically sealing the LED light source and the power supply, and (ii) having a transparent portion for transmitting light from the light source to the holographic diffuser.

29. A lighting device as defined in claim 16 wherein the lighting device is portable.

30. A lighting device as defined in claim 16 wherein the at least two optical areas comprise (i) a first optical area that is the light diffusing hologram and (ii) a second optical area having essentially no effect on light from the at least one LED.

31. A lighting device as defined in claim 16 wherein the holographic diffuser is glass.

32. A lighting device as defined in claim 16 wherein the holographic diffuser is plastic.

33. A lighting device as defined in claim 16 wherein the light source comprises (i) only one LED and (ii) focusing optics for collimating light from the light emitting semiconductor die of the LED, and wherein the holographic diffuser comprises only one of each of the at least two optical areas.

34. A lighting device as defined in claim 16 wherein the light source comprises (i) a plurality of LEDs and (ii) focusing optics for collimating light from their respective dies, and wherein the holographic diffuser comprises one of each of the at least two optical areas for each LED.

* * * * *